UNITED STATES PATENT OFFICE.

SVEN EMIL SIEURIN, OF HÖGANÄS, SWEDEN, ASSIGNOR TO HÖGANÄS-BILLESHOLMS AKTIEBOLAG, OF HELSINGBORG, SWEDEN.

PROCESS OF PRODUCING ALUMINUM-CHLORIDE CRYSTALS.

1,403,061. Specification of Letters Patent. Patented Jan. 10, 1922.

No Drawing. Application filed February 7, 1920. Serial No. 356,993.

*To all whom it may concern:*

Be it known that I, SVEN EMIL SIEURIN, a subject of the King of Sweden, residing at Höganäs, Sweden, have invented new and useful Improvements in Processes of Producing Aluminum-Chloride Crystals, of which the following is a specification.

Oxide of aluminum, as already known, is produced by dissolving aluminous raw material in hydrochloric acid, concentrating the solution thus obtained and saturating it with hydro-chloric acid, whereby the chloride of aluminum is precipitated in the form of crystals, which are then calcined, whereby the chloride is converted into oxide.

According to the present invention, the crystals of aluminum chloride may be conveniently separated from the highly saturated solution by treatment in a centrifugal apparatus, either coated with rubber or consisting of acid-proof pottery. For eliminating the evolving fumes of hydrochloric acid while working such solutions, either in a centrifugal apparatus or other vessel in which the crystals are to be separated, a concentrated but not precipitated solution of aluminum chloride is forced from below into said vessel, which solution displaces the specifically lighter mother solution saturated with hydrochloric acid from the crystals, and takes its place. The crystal mass is then placed in a separator, for instance, a centrifugal separator, where the crystals are separated from the solution. The displaced solution may, if the aluminous raw material is poor in iron, be used for the dissolution of new raw material. After repeated use of the solution, however, the aluminum chloride crystals obtained become too rich in iron, for which reason it is necessary that the solution be purified from time to time, and which purification may be accomplished in the following manner:

To the displaced solution is added hot, rather concentrated sulphuric acid, for instance 1.71 sp. g., whereby the hydro-chloric acid is driven off also from the chlorides in a gaseous form and condensed in water to be eventually used either for dissolution of new aluminous raw material or—preferably—for the saturation of a solution of chloride of aluminum with the object of precipitating the said chloride in the form of crystals.

The sulphuric acid used for the driving off of the hydro-chloric acid becomes diluted and is again concentrated in any known manner, whereupon it may be again used for obtaining hydro-chloric acid from the ferruginous mother solution. When the acid has been repeatedly used, its contents of iron is increased so much that a precipitation of the sulphates dissolved in it may occur. For preventing such a precipitation the acid is cooled, whereby sulphate of iron is precipitated, which then is separated from the acid by centrifugal action, decantation or filtration, whereupon the acid again may be used for the purpose in question. Such a purification of the acid suitably may take place with a portion of it during every circulation.

Having now particularly described the nature of my invention and the manner of its operation, what I claim is:

1. The process of producing aluminum chloride crystals, which consists in dissolving aluminous material in hydrochloric acid, saturating the solution with said acid, and displacing said solution with a concentrated solution of chloride of aluminum, thereby to separate the crystals from the saturated solution.

2. The process of producing aluminum chloride crystals, which consists in dissolving aluminous material in hydrochloric acid, saturating the solution with said acid, for precipitation of chloride of aluminum, and introducing into the solution from below a concentrated solution of chloride of aluminum free from solid particles, thereby to displace the saturated solution and separate the same from the precipitated crystals.

In testimony whereof I have signed my name to this specification.

SVEN EMIL SIEURIN.